(12) United States Patent
Cason (10) Patent No.: US 10,411,988 B1
(45) Date of Patent: Sep. 10, 2019

(54) DATA INJECTION TESTING

(71) Applicant: Wells Fargo Bank, N.A., San Francisco, CA (US)

(72) Inventor: David Cason, Worthington, OH (US)

(73) Assignee: Wells Fargo Bank, N.A., San Francisco, CA (US)

( * ) Notice: Subject to any disclaimer, the term of this patent is extended or adjusted under 35 U.S.C. 154(b) by 205 days.

(21) Appl. No.: 15/672,041

(22) Filed: Aug. 8, 2017

Related U.S. Application Data

(60) Provisional application No. 62/440,974, filed on Dec. 30, 2016.

(51) Int. Cl.
*H04L 12/26* (2006.01)
*H04L 29/06* (2006.01)

(52) U.S. Cl.
CPC .......... *H04L 43/50* (2013.01); *H04L 43/0805* (2013.01); *H04L 63/20* (2013.01)

(58) Field of Classification Search
CPC ...... H04L 43/50; H04L 43/0805; H04L 63/20
See application file for complete search history.

(56) References Cited

U.S. PATENT DOCUMENTS

| | | | |
|---|---|---|---|
| 9,397,922 B1* | 7/2016 | Collins | H04L 43/50 |
| 2012/0120819 A1* | 5/2012 | Regev | H04L 43/50 |
| | | | 370/252 |
| 2013/0003565 A1* | 1/2013 | Gotwals | H04L 43/50 |
| | | | 370/248 |
| 2015/0163152 A1* | 6/2015 | Li | H04L 47/2441 |
| | | | 370/409 |
| 2016/0261493 A1* | 9/2016 | Li | H04L 45/42 |

* cited by examiner

*Primary Examiner* — Hashim S Bhatti
(74) *Attorney, Agent, or Firm* — Shumaker & Sieffert, P.A.

(57) ABSTRACT

In an example, a computer-implemented method includes generating test data that is configured to be identified as data of interest at one or more visibility points in a network having a plurality of network routes. The method also includes injecting the test data into each network route of the plurality of network routes at a location upstream from the one or more visibility points, and determining, for each network route through which the test data travels, whether the test data is identified at the one or more visibility points. The method also includes outputting, for each network route through which the test data travels, data that indicates whether the test data is identified at the one or more visibility points as data of interest.

20 Claims, 6 Drawing Sheets

FIG. 6

DATA INJECTION TESTING

This application claims the benefit of U.S. Provisional Application Ser. No. 62/440,974, filed Dec. 30, 2016, the entire content of which is incorporated herein by reference.

TECHNICAL FIELD

The invention relates to data security in a networked computing environment.

BACKGROUND

A networked computing environment may include a number of interdependent computing devices, servers, and processes that transmit and receive data via a network. In some instances, one or more network security tools may be deployed to monitor network data and identify data that that may be malicious. The network security tools may be deployed at a number of locations throughout the network and may be tasked with processing a relatively large amount of data. For example, an enterprise computing environment may include hundreds or thousands of computing devices, servers, and processes that transmit or receive network data via a large number of network routes. In certain instances, it may be difficult to determine whether the security tools are identifying and/or processing the data.

SUMMARY

In general, the techniques of this disclosure relate to measuring system effectiveness. For example, a networked computing environment may have a plurality of network routes and one or more visibility points that monitor and/or process data traffic on those routes, e.g., such as one or more data security appliances. According to aspects of this disclosure, a computing device may generate test data that is configured to be identified as data of interest at the visibility points of the network. The computing device may inject the test data into each network route at a location upstream from the one or more visibility points, and verify, for each network route through which the test data travels, that the test data is identified at the one or more visibility points. In examples of networks having more than one visibility point, the computing device may also verify that each of the visibility points identifies the data, e.g., by comparing data identified at the visibility points. The computing system may repeat the testing at regular intervals. In this way, the techniques may provide a comprehensive measurement of system effectiveness by testing each route and each visibility point.

In an example, a computer-implemented method includes generating test data that is configured to be identified as data of interest at one or more visibility points in a network having a plurality of network routes. The method also includes injecting the test data into each network route of the plurality of network routes at a location upstream from the one or more visibility points, and determining, for each network route through which the test data travels, whether the test data is identified at the one or more visibility points. The method also includes outputting, for each network route through which the test data travels, data that indicates whether the test data is identified at the one or more visibility points as data of interest.

In another example, a computing device comprises a memory configured to store test data that is configured to be identified as data of interest at one or more visibility points in a network having a plurality of network routes, and one or more processors. The one or more processors are in communication with the memory and configured to generate the test data, inject the test data into each network route of the plurality of network routes at a location upstream from the one or more visibility points, determine, for each network route through which the test data travels, whether the test data is identified at the one or more visibility points, and output, for each network route through which the test data travels, data that indicates whether the test data is identified at the one or more visibility points as data of interest.

In another example, a non-transitory computer-readable storage medium has instructions stored thereon that, when executed, cause one or more processors to generate test data that is configured to be identified as data of interest at one or more visibility points in a network having a plurality of network routes, inject the test data into each network route of the plurality of network routes at a location upstream from the one or more visibility points, determine, for each network route through which the test data travels, whether the test data is identified at the one or more visibility points, and output, for each network route through which the test data travels, data that indicates whether the test data is identified at the one or more visibility points as data of interest.

The details of one or more examples of the disclosure are set forth in the accompanying drawings and the description below. Other features, objects, and advantages of the disclosure will be apparent from the description and drawings, and from the claims.

DETAILED DESCRIPTION

Traditional attempts to understand the health of certain computing systems may be limited to outside-perspective monitoring concepts. For example, outside-perspective monitoring concepts may include determining whether system components are powered and whether system components are operating. However, such monitoring concepts may not provide a reliable measure of actual system effectiveness, e.g., how well a particular system is doing its job.

With respect to a data security appliance in a network system, as an example, monitoring whether the data security appliance is powered and operating does not provide a reliable indication of how well the data security appliance is monitoring network traffic and identifying unauthorized or malicious data.

According to aspects of this disclosure, a computing device may create innocuous events of interest and inject the events of interest into each possible network route of a networked environment. The computing device may then verify that the events of interest are recognized and processed by visibility points in the network, which may include upstream security tools. The computing device may repeat the process of creating, injecting, and verifying test data in order to provide a complete assessment of how well system components are operating over a given time period (e.g., over an entire day).

Figure 1:
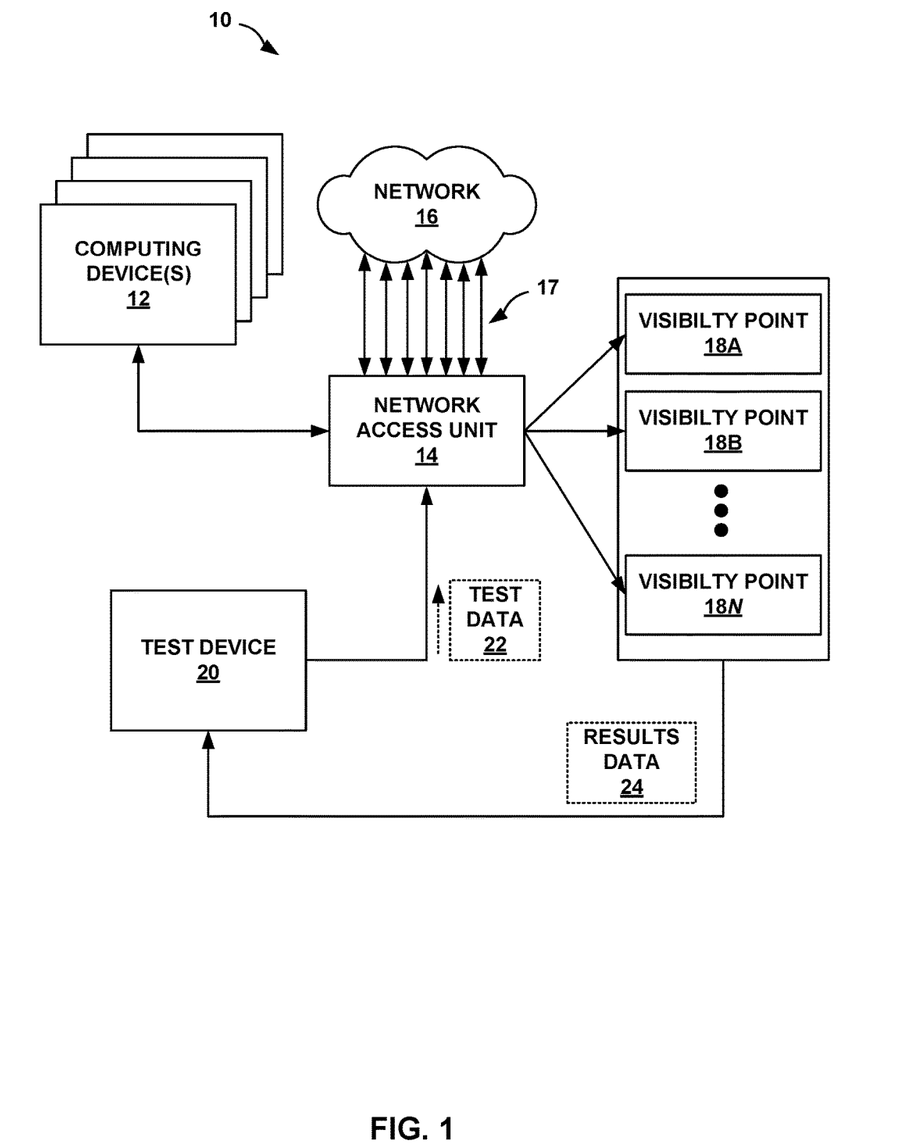
FIG. 1 is a block diagram illustrating an example networked computing system having a test device that is configured to verify system effectiveness in accordance with the techniques of this disclosure.

FIG. 1 is a block diagram illustrating an example computing system 10 for verifying system effectiveness in accordance with the techniques of this disclosure. The example computing system 10 of FIG. 1 includes computing devices 12 that are connected to a network access unit 14 that provides access to network 16 via a plurality of network routes 17. System 10 also includes visibility points 18A-18N (collectively, visibility points 18) and a test device 20 that is configured to generate and transmit test data 22.

The architecture of system 10 illustrated in FIG. 1 is shown for exemplary purposes only and network system 10 should not be limited to this architecture. For example, system 10 illustrated in FIG. 1 shows a plurality of visibility points 18 connected to network access unit 14. In other examples, as described below, there may be one or more visibility points 18 distributed throughout system 10.

Computing devices 12 may provide processing resources or store data to support a wide variety of applications. The functionality of computing devices 12 may be implemented in hardware or in a combination of software and hardware, where requisite hardware may be provided to store and execute software instructions. For example, computing devices 12 may include any of a wide range of user devices, including laptop or desktop computers, tablet computers, so-called "smart" phones, "smart" pads, or other personal digital appliances. Computing devices 12 may additionally include any combination of application servers, web servers, computing servers, database servers, file servers, media servers, communications servers, or another other computing device capable of sharing processing resources and/or data with other computing devices.

In some instances, computing devices 12 may form all or a portion of an enterprise computing environment that is configured to support a wide variety of services associated with a business. In an example for purposes of illustration, computing devices 12 may support services associated with a financial institution that offers different banking products, such as checking accounts, savings accounts, and credit accounts; and different lending products, such as home loans, car loans, business loans, student loans, and the like.

Network access unit 14 may provide computing devices 12 access to network 16 via network routes 17. For example, network access unit 14 may include a variety of routers, switches, or other components for routing data from computing devices 12 to an external network such as the Internet. Network access unit 14 may include one or more firewalls, sever infrastructure, or other components and may be positioned on a perimeter of network 16 acting as a gateway between computing devices 12 and network 16. As described in greater detail with respect to the example of FIG. 2, network routes 17 may be managed using network proxies that are stand-alone devices or incorporated in network access unit 14.

Network 16 may comprise a private network that includes, for example, a private network associated with a financial institution, or may comprise a public network, such as the Internet. Although illustrated as a single entity, network 16 may comprise a combination of networks. Computing devices 12 may be connected to network 16 via wired and/or wireless links. The links may form part of a packet-based network, such as a local area network, a wide-area network, or a global network such as the Internet. The links may include intermediate routers, switches, base stations, or any other equipment that may be useful to facilitate communication between devices connected to network 16.

Visibility points 18 may include a wide variety of devices and/or services that have access to data of system 10. That is, as described herein, a visibility point may generally refer to any device or service that has access to or interacts with data being transmitted or received within a system or network. In the context of network security, visibility points 18 may comprise a variety of data security appliances that are configured to inspect data for cyber threats such as malware or other unauthorized or malicious data. In other examples, visibility points 18 may include other devices incorporated in a system for carrying out a particular function, such as computing devices included in a high frequency trading platform.

Test device 20 may include a variety of devices for processing and/or manipulating data. For example, in general, the functionality of test device 20 may be implemented in a device that includes one or more processing units, such as one or more microprocessors. The functionality of test device 20 may be implemented in hardware or in a combination of software and hardware, where requisite hardware may be provided to store and execute software instructions. While shown as a single computing device in the example of FIG. 1 for purposes of illustration, in some examples, test device 20 may include a distributed network of computing devices including one or more workstations, servers, and/or other computing devices.

Test data 22 may include any data that is identifiable as data of interest by visibility points 18. Test data 22 may be referred to as "innocuous data," in that test data 22 is not intended to carry out any function other than testing how effectively data is identified and/or processed by components of system 10. With respect to network security, as an example, test device 20 may generate test data 22 to be identified by visibility points 18 as being unauthorized or malicious without actually containing data that is malicious to components of system 10. For example, visibility points 18 may be configured with one or more rules that define which data to process, and test data 22 may be based on such rules.

According to aspects of this disclosure, test device 20 may generate test data 22 to measure the effectiveness of visibility points 18, e.g., to determine whether visibly points 18 are able to identify and process test data 22. The ability to identify and process test data 22 may indicate that visibility points 18 are also able to effectively identify and process other system data, such as data being received from and/or transmitted to network 16 by computing devices 12. That is, the ability to identify and process the innocuous test data 22 may indicate that visibility points 18 are also able to effectively identify and process potentially unauthorized or malicious data.

The specific configuration of test data 22 may depend on the particular system effectiveness being tested. For example, test device 20 may generate test data 22 to include a particular type of data that is meaningful to the test. In an example for purposes of illustration, test device 20 may generate test data 22 to include an indication of a time at which test data 22 is generated or injected into network routes 17. In other examples, test device 20 may generate test data 22 to include other types of data such as data that indicates a test target, data that includes strings of symbols, data that includes a hash or encryption pattern, emails and email attachments, or the like.

Visibility points 18 may be configured to identify the particular type of test data 22 generated by test device 20. For example, a system administrator may configure visibility points 18 with one or more rules for identifying test data 22. Visibility points 18 may apply the rules to all data being transmitted on network routes 17.

After visibility points 18 have been configured to identify test data 22, test device 20 may transmit test data 22 to pass through each of network routes 17 (which may be referred to as "injecting" test data 22) at a location upstream from visibility points 18. In the example shown in FIG. 1, test device 20 injects test data upstream from network access unit 14, which is generally responsible for controlling data traffic to and from network 16 and therefore visible to each of visibility points 18. In other examples, test device 20 may inject test data 22 at other locations in system 10, provided visibility points 18 are still able to access test data 22.

According to aspects of this disclosure, test device 20 may determine, for each of network route 17 through which test data 22 travels, whether visibility points 18 have identified and/or processed test data 22. For example, test device 20 (or another management or reporting tool) may obtain, from each of visibility points 18, results data 24 indicating that visibility points 18 have identified test data 22. In some examples, test device 20 may also obtain other data from visibility points 18, such as data indicating a time at which test data 22 is processed, the manner in which visibility points 18 identified test data 22 (e.g., how visibility points 18 categorized test data 22), and/or the manner in which visibility points 18 process test data 22 (e.g., what processes visibility points 18 applied to test data 22). Test device 20 may obtain the data from visibility points 18 and determine whether visibility points 18 have identified and/or processed test data 22 based on the received data.

Test device 20 may also output data indicating whether visibility points 18 have identified and/or processed test data 22. For example, test device 20 may output data indicating that one or more visibility points 18 did not identify test data 22 or improperly categorized or processed test data 22. Again, while illustrated as a single component in the example of FIG. 1, it should be understood that test device 20 may comprise more than one device or service. For example, test device 20 may include devices or services for generating test data 22 and injecting test data 22 that are separate from devices or services that are responsible for obtaining results data 24, determining whether visibility points 18 have identified and/or processed test data 22, and/or outputting data that indicates whether visibility points 18 have identified and/or processed test data 22.

According to aspects of this disclosure, test device 20 may repeat the testing (e.g., generating test data 22, injecting test data 22, and determining whether visibility points 18 have identified and/or processed test data 22) at regular intervals. In an example for purposes of illustration, test device 20 may repeat testing at every hour on the half hour. In this example, visibility points 18 may identify test data 22 in a single hour block with some time to process test data 22 late, but at regular enough intervals to identify deficiencies. In other examples, test device 20 may use other intervals between tests, such as every 10 minutes, every half hour, or the like. In this way, the techniques may provide a comprehensive indication of whether and how well visibility points 18 are identifying and/or processing test data 22 over a given time period.

In examples in which system 10 includes multiple visibility points 18, test device 20 may additionally or alternatively compare test results between visibility points 18. For example, test device 20 may obtain results data from visibility point 18A indicating that visibility point 18A processed test data 22 at a particular time. Test device 20 may obtain results data from visibility point 18B indicating that visibility point 18B did not identify or process test data 22 at the particular time. In this example, test device 20 may determine that visibility point 18B failed to properly identify test data 22 at the particular time.

In this way, the techniques may be used to measure system effectiveness in a variety of ways. For example, test device 20 may determine that visibility points 18 are actually processing data for all network routes 17, as well as the manner in which visibility points 18 are processing the data.

Figure 2:
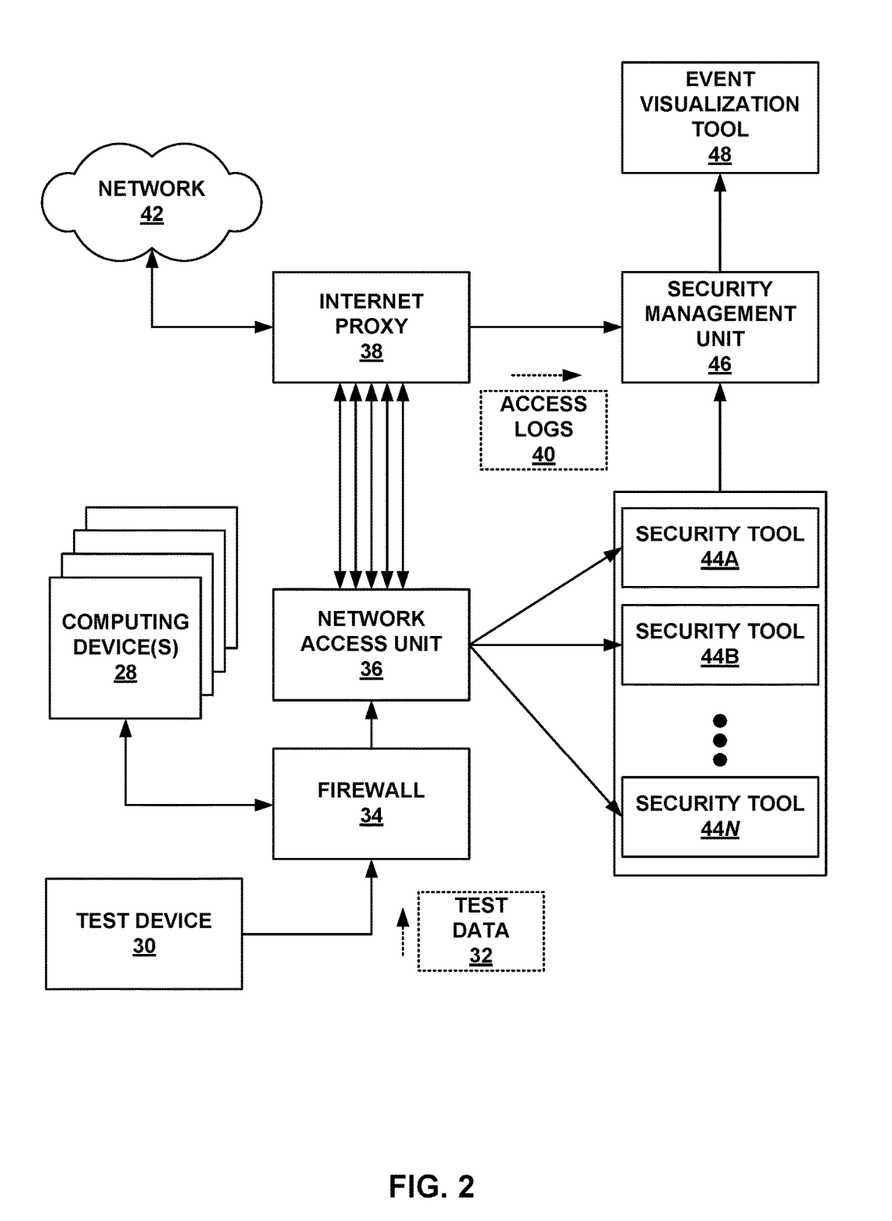
FIG. 2 is a block diagram illustrating another example networked computing system having a test device that is configured to verify system effectiveness in accordance with the techniques of this disclosure.

FIG. 2 is a block diagram illustrating another example networked computing system having a test device that is configured to verify system effectiveness in accordance with the techniques of this disclosure. The example of FIG. 2 includes computing devices 28, test device 30, test data 32, firewall 34, network access unit 36, internet proxy 38 that generates access logs 40, and network 42. FIG. 2 also includes security tools 44A-44N (collectively, security tools 44), a security management unit 46, and an event visualization tool 48. The architecture of the system illustrated in FIG. 2 is shown for exemplary purposes only, and other examples may have additional, fewer, or alternative components than those shown in FIG. 2.

The example of FIG. 2 generally illustrates the techniques in the context of testing the effectiveness of network security devices or services. In some examples, certain components of FIG. 2 may be configured similarly or the same as components illustrated in the example of FIG. 1. For example, computing devices 28 may generally correspond to computing devices 12, test device 30 may generally correspond to test device 20, test data 32 may generally correspond to test data 22, network access unit 36 may generally correspond to network access unit 14, and network 42 may generally correspond to network 16.

Firewall 34 may include devices and/or services that monitor and control incoming and outgoing network traffic based on predetermined security rules. Firewall 34 may be located at the perimeter of a network and be responsible for processing all data transmitted to computing devices 28 from network 42. Internet proxy 38 may include one or more proxy servers for managing connections to network 42. In some examples, internet proxy 38 may include individual Internet Protocol (IP) proxy routes to network 42. In other examples, internet proxy 38 may include load-balanced Virtual IP (VIP) proxy routes to network 42. Access logs 40 may provide an indication of data traffic managed by internet proxy 38.

Security tools 44 may be responsible for identifying and processing network data, such as data received by computing devices 28 from network 42, such as the Internet. Example security tools 44 include FireEye Central Management System and Dynamic Threat Intelligence products developed by FireEye Incorporated, TippingPoint Intrusion Prevention System developed by Trend Micro Corporation, Security Analytics developed by RSA Corporation, or a wide variety of other proprietary or publically available devices or services for providing cybersecurity.

Security management unit 46 may perform security analytics or intelligence as a part of a security information and event management (SIEM) platform. Security management unit 46 may receive data from security tools 44, access logs 40 from internet proxy 38, or other sources. As an example, security management unit 46 may include ArcSight Enterprise Security Manager software developed by Hewlett-Packard company.

According to aspects of this disclosure, test device 30 may generate test data 32 and inject test data 32 into the system shown in FIG. 2. In some examples, test device 30 may call a wget-style or curl-style command to fetch test data 32. In other examples, test device 30 may export a particular proxy or VIP and then use a wget command to fetch test data 32. In an example for purposes of illustration, to test VIP routes associated with a network operations center (NOC) that includes internet proxy 38, test device 30 may execute the following commands at a Linux command line:
    export http_proxy=http://proxy-businessname.com:8080
    wget- -user-agent="Mozilla/5.0 (compatible; MSIE 8.0; Windows
    NT; Single_Proxy_Simple_Data_Injection_Test)"
    http://fedeploycheck.fireeye.com/appliance-test/alert.html In examples in which one of security tools 44 is a FireEye data security appliance, such a security tool 44 may detect the test by default, due to the URL being a FireEye-made testing target. In other examples, other URLs may be included so that the test is detected by other security tools 44.

Custom user agents added to these events include simple signatures that allow a variety of security tools 44 to detect the same test traffic. For example, according to aspects of this disclosure, test data 32 may be designed to include one of two user agents. A first user agent may be associated with a proxy IP, while a second user agent may be associated with a load-balanced Virtual IP (VIP) of a data center, as illustrated by the examples below:
    Mozilla/5.0 (compatible; MSIE 8.0; Windows
    NT; Single_Proxy_Simple_Data_Injection_Test);
    Mozilla/5.0 (compatible; MSIE 8.0; Windows
    NT; VIP_Proxy_Simple_Data_Injection_Test)

In the example above, test device 30 may generate test data 32 to include the custom user agent string that is identifiable by security tools 44. The user agent includes a test target (e.g., single_proxy or VIP_proxy) and a test type (e.g., simple). In other examples, the user agent may include additional or different data. For example, the user agent may include one or more time values, symbol strings, hashes, encrypted patterns or the like.

In examples in which one of security tools 44 includes the Security Analytics (also known as NetWitness) or a similar software package, security tool 44 may use an application rule (or "App Rule") to flag test events, so that the test events may be identified and forwarded to security management unit 46. An example application rule is as follows:
    FireEye User Agent Checking via Proxies: client contains 'proxy_simple_data_injection_test'

The above rule may be tagged in a meta key called "company.risk" and may be forwarded along to security management unit 46 via a reporter rule on the Security Analytics system. In this example, a Reporter rule that drives a system log (syslog) alert to security management unit 46 simply identifies company.risk='FireEye User Agent Checking via Proxies' and the forwarded data includes the specific user agent involved. In this manner, security management unit 46 and event visualization tool 48 may use the data to identify and differentiate the two test types. In examples in which one of security tools 44 includes the Tipping Point or a similar software package that analyzes web traffic, security tool 44 may use a basic HTTP custom filter that matches the user agent string.

The examples above are intended for purposes of illustration only. That is, test device 30 may generate test data 32 to include any contrived data that is designed not only for security tools 44 to recognize, but also for security tools 44 to understand and process. For example, test data 32 may include multiple time values. In this example, test data 32 may include a time at which test data 32 is injected, a time at which security tools 44 receive test data 32 (e.g., an ingestion time), and/or a time at which test data 32 is realized by security tools 44.

In instances in which security tools 44 have special or advanced features for analyzing data, test device 30 may generate test data 32 to be identified by such special or advanced features. For example, security tools 44 may be configured to recognize symbol strings, hashes, or other patterns. In such an example, test device 30 may generate test data 32 to include symbol strings, hashes, or other patterns to be identified by security tools 44. In still other examples, security tools 44 may be configured to identify target destinations for data transmitted over network 42. In such examples, test device 30 may generate test data 32 to include a particular target destination.

Security management unit 46 receives data from security tools 44, access logs 40 from internet proxy 38, or other sources, and determines whether security tools 44 properly identify and/or process test data 32. For example, security management unit 46 may include a variety of tools or software for verifying that respective security tools 44 identified test data 32 injected by test device 30. Security management unit 46 may also be configured to determine other factors based on the particular data included in test data 32. For example, security management unit 46 may determine a time at which test data 32 was received by respective security tools 44, a time at which test data 32 was processed by respective security tools 44, and whether respective security tools 44 properly identified the content of test data 32 (e.g., such as symbol strings, hashes, encrypted patterns or the like).

In an example for purposes of illustration, test device 30 may be configured to inject test data 32 into the network one time per hour. Security management unit 46 may verify that respective security tools 44 identify that test data 32 one time in per hour. Security management unit 46 may identify a processing delay if a particular one of security tools 44 does not identify test data 32 during one hour, but identifies two instances of test data 32 another hour. In another example, security management unit 46 may identify a processing delay or malfunction by one of security tools 44 identifies test data 32 but another of security tools 44 fails to identify test data 32 or identifies test data 32 at a delayed time relative to one or more other security tools 44.

According to aspects of this disclosure, in some examples, security management unit 46 may also compare data from security tools 44 to one or more other sources of data to verify that test data 32 is properly identified and processed. For example, security management unit 46 may receive access logs 40 from internet proxy 38. The access logs 40 may indicate each instance of service such that each instance of test data 32 is captured in an entry of access logs 40. Security management unit 46 may compare instances in which security tools 44 fail to identify or process test data 32 to access logs 40 in order to verify that security tools 44 were responsible for the failure.

In an example for purposes of illustration, security management unit 46 may determine that security tool 44A did not identify and/or process test data 32 at a particular instance in time. Security management unit 46 may cross check access logs 40 to verify that test data 32 was serviced by internet proxy 38 at the particular instance in time. If test data 32 is included in access logs 40, security management unit 46 may determine that security tool 44A did not identify and/or process test data 32. If, however, test data 32 is not included in access logs 40, security management unit 46 may determine that internet proxy 38 may be down and not operational.

In some examples, security management unit 46 may take a hierarchical approach to determining the effectiveness of security tools 44. For example, security management unit 46 may initially determine whether security tools 44 identify an instance of test data 32. Security management unit 46 may then determine whether security tools 44 identified and/or processed test data 32 in a timely manner, e.g., within an expected time period accounting for inherent network latencies. Security management unit 46 may then determine whether security tools 44 processed test data 32 in an expected manner. For example, security management unit 46 may determine whether security tools 44 processed test data 32 based on the type of data included in test data (e.g., a sandboxing feature of one of security tools 44 was activated based on identification of a particular type of test data 32).

Event visualization tool 48 may generate a report that indicates whether security tools 44 properly identify and/or process test data 32. For example, event visualization tool 48 may generate a variety of tables, graphs, charts, or the like that indicate whether security tools 44 properly identify and/or process test data 32. An example of event visualization tool 48 is Splunk Enterprise developed by Splunk Corporation.

Figure 3:
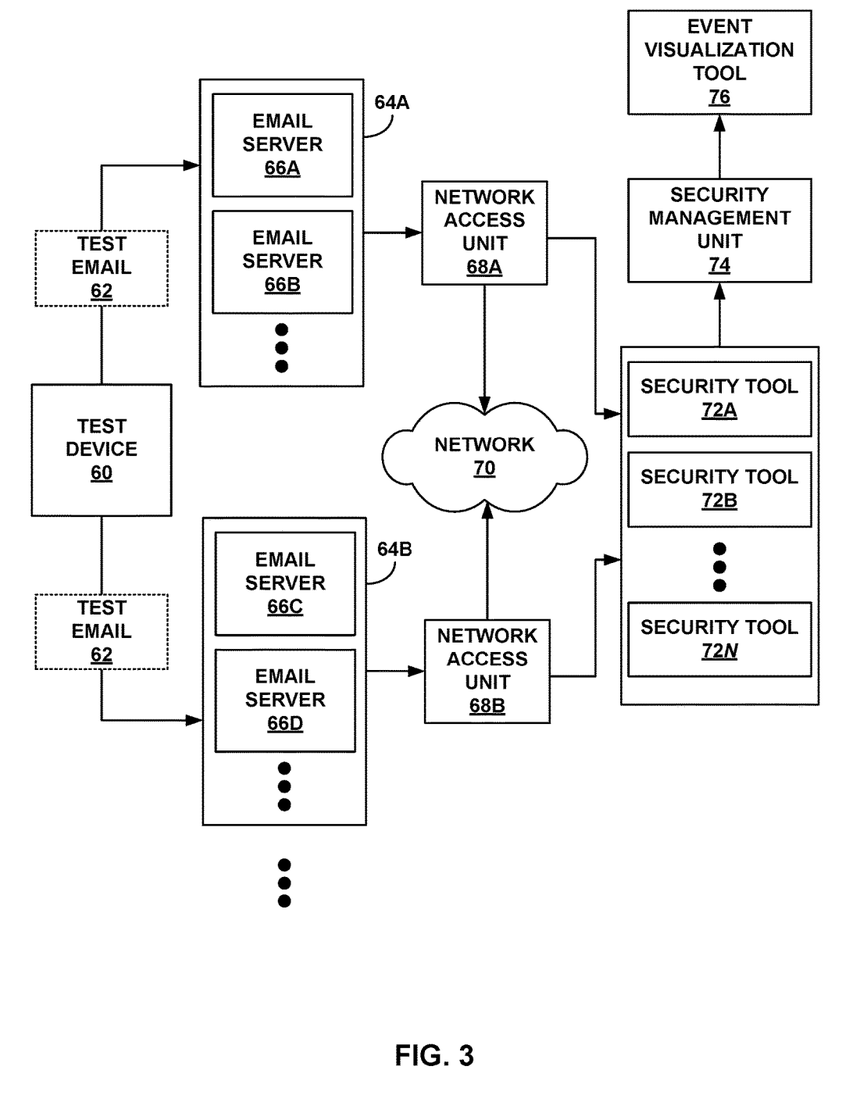
FIG. 3 is a block diagram illustrating another example networked computing system having a test device that is configured to verify system effectiveness in accordance with the techniques of this disclosure.

FIG. 3 is a block diagram illustrating another example networked computing system having a test device that is configured to verify system effectiveness in accordance with the techniques of this disclosure. The example of FIG. 3 includes test device 60, test email 62, data centers 64A and 64B (collectively data centers 64) having respective email servers 66A-66D (collectively, email servers 66), and network access units 68A and 68B for connecting to network 70. FIG. 3 also includes security tools 72A-72N (collectively, security tools 72), a security management unit 74, and an event visualization tool 76. The architecture of the system illustrated in FIG. 3 is shown for exemplary purposes only, and other examples may have additional, fewer, or alternative components than those shown in FIG. 3.

The example of FIG. 3 generally illustrates the techniques in the context of testing the effectiveness of email security devices or services. In some examples, certain components of FIG. 3 may be configured similarly or the same as components illustrated in the example of FIG. 1 (and/or FIG. 2). For example, test device 60 may generally correspond to test device 20, test data 62 may generally correspond to test data 22, network access units 68 may generally correspond to network access unit 14, and network 70 may generally correspond to network 16. In addition, security tools 72 may correspond to security tools 44 of FIG. 2 and security management unit 74 and event visualization tool 76 may correspond to security management unit 46 and event visualization tool 48, respectively, of FIG. 2.

According to aspects of this disclosure, test device 60 may generate test email 62 that includes data of interest, e.g., that security tools 72 are configured to identify as unauthorized and/or malicious data. As described above with respect to the example of FIG. 2, the data of interest may be any contrived data that is designed for security tools 72 to recognize as well as understand and process. For example, test device 60 may generate test email 62 to include a sender that is to be identified as data of interest. In another example, test device 60 may generate test email 62 to include a symbol string that is to be identified as data of interest by security tools 72. In still another example, test device 60 may generate test email 62 to include an attachment that is to be identified as data of interest by security tools 72.

In an example for purposes of illustration, test device 60 may be configured to generate test email 62 to include a PDF document that is designed as data of interest to be identified by security tools 72. As another example, test device 60 may be configured to generate test email 62 to include content that is identifiable based on a YARA rule enforced by one or more of security tools 72 that specifies a particular file type and/or language (e.g., a Russian Word document).

According to aspects of this disclosure, test device 60 may generate test email 62 for an email test from a command-line driven script called from a chronological job. Test device 60 may construct a subject line that includes the testing source and the Mail Transfer Agent (MTA) target, and attach a test file expected to be detected by one or more of security tools 72. An example script is written in PERL is as follows:

```
#!/Apps/nagios/bin/perl
use strict;
use warnings;
use Sys::Hostname;
use Net::SMTP;
use Data::Dumper;
use MIME::Lite;
use POSIX qw (strftime);
use Nagios::Plugin;
use lib "/Apps/nagios/libexec";
use utils qw(%ERRORS);
my $exit_code=$ERRORS{'OK'};
my $mxcluster='mxin.wellsfargo.com';
my
   $FROM='SCDDataInjectionTesting@wellsfargo.com';
my $TO='SCDDataInjectionTesting@wellsfargo.com';
my $origin=hostname( );
my @out='/usr/bin/host -t mx $mxcluster';
if ($?>>8) {
   print "Unable to determine mx hosts for $mxcluster:
      $!\n";
   exit $ERRORS{"UNKNOWN"};
}
my @mxhosts;
foreach (@out) {
   m/.*(*)\./;
   push @mxhosts, $1;
}
my $time1=strftime "%D %T %Z", localtime;
foreach my $host(@mxhosts) {
   foreach my $f(glob "/Apps/nagios/var/smtp_test_files/
      *") {
      (my $a=$f)=~s{.*/}{ };
      (my $dest=$host)=~s/.wellsfargo.com//;
      my $msg=MIME::Lite->new(
         From=>$FROM,
```

```
    To⇒$TO,
    Subject⇒"wf_data_injection_testing—$origin to
        $dest",
    Type⇒"multipart/mixed",)
);
$msg→attach(
    Type⇒'application/octet-stream',
    Data⇒"Inject time:$time1"
);
$msg→attach(
    Type⇒'application/octet-stream',
    Path⇒$f,
    Filename⇒$a,
    Disposition⇒'attachment'
);
eval {$msg→send('smtp', $host, Timeout⇒5);};
if ($@) {
    print "Unable to send mail through $dest: $@\n";
    $exit_code=$ERRORS{"WARNING"};
    last;
} else {
    print "Sending mail with file $a through $dest\n";
    }
  }
 }
}
exit $exit_code;
```

Test device 60 injects test email 62 into the system by transmitting test email 62 to each of email servers 66 of data centers 64. Email servers 68 respectively process test email 62 and route test email 62 to a particular target destination. Test email 62 is routed through network access units 68 to network 70. Security tools 72 are configured as visibility points for all traffic passing through network access units 68, including test email 62. Hence, security tools 72 are configured to identify test email 62, e.g., as including unauthorized or malicious data.

Security management unit 74 receives data from security tools 72 and determines whether security tools 72 properly identify and/or process test email 62. For example, security management unit 74 may include a variety of tools or software for verifying that respective security tools 72 identified test email 62 injected by test device 60. Security management unit 74 may also be configured to determine other factors based on the particular data included in test email 62. For example, security management unit 74 may determine a time at which test email 62 was received by respective security tools 72 (e.g., an ingestion time), a time at which test email 62 was processed by respective security tools 72, whether respective security tools 72 properly identified the content of test email 62 (e.g., such as data included in the sender field, recipient field or subject field, symbol strings, hashes, encrypted patterns or the like).

As described above with respect to FIG. 2, test device 60 may be configured to inject test email 62 into the network at a predetermined interval, e.g., one time per hour, two times per hour, or the like. Security management unit 74 may verify that respective security tools 72 identify test email 62 at the predetermined interval. In some examples, security management unit 74 may compare results from respective security tools 72 to identify any security tools 72 that are not operating correctly.

In some examples, security management unit 74 may take a hierarchical approach to determining the effectiveness of security tools 72. For example, security management unit 74 may initially determine whether security tools 72 identify an instance of test email 62. Security management unit 74 may then determine whether security tools 72 identified and/or processed test email 62 in a timely manner, e.g., within an expected time period accounting for inherent network and/or processing latencies. Security management unit 74 may then determine whether security tools 72 processed test email 62 in an expected manner. For example, security management unit 74 may determine whether security tools 72 processed test email 62 based on the type of data included in the email (e.g., a sandboxing feature of one of security tools 72 was activated based on a YARA rule established at the security tool 72).

Event visualization tool 76 may generate a report that indicates whether security tools 72 properly identify and/or process test email 62. For example, event visualization tool 76 may generate a variety of tables, graphs, charts, or the like that indicate whether security tools 72 properly identify and/or process test email 62.

Figure 4:
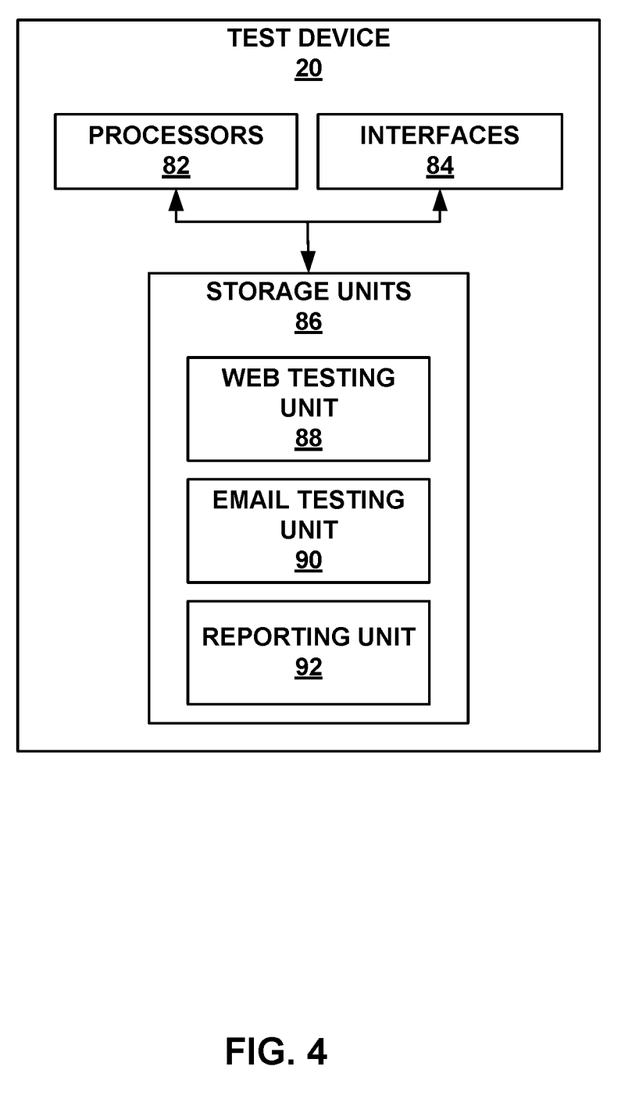
FIG. 4 is a block diagram illustrating several components of a test device in greater detail in accordance with the techniques of this disclosure.

FIG. 4 is a block diagram illustrating several components of test device 20 of FIG. 1 in greater detail. In some instances, test device 30 (FIG. 2) and test device 60 (FIG. 3) may also be configured similarly to the example shown in FIG. 4. In the illustrated example, test device 20 includes one or more processors 82, one or more interfaces 84, and one or more storage units 86 storing web testing unit 88, email testing unit 90, and reporting unit 92. The architecture of computing device 12 illustrated in FIG. 4 is shown for exemplary purposes only. In other examples, test device 20 may be configured in a variety of other ways having additional, fewer, or alternative components than those shown in FIG. 4.

For example, while the example of FIG. 4 illustrates test device 20 as including web testing unit 88, email testing unit 90, and reporting unit 92, in other examples, such components may be distributed among more than one computing device. That is, test device 20 may include web testing unit 88 and/or email testing unit 90 for generating test data, while reporting unit 92 may be included in a separate computing device for generating and/or outputting results data.

Processors 82, in one example, are configured to implement functionality and/or process instructions for execution within test device 20. For example, processors 82 may be capable of processing instructions stored by storage units 86. Processors 82 may include, for example, microprocessors, digital signal processors (DSPs), application specific integrated circuits (ASICs), field-programmable gate array (FPGAs), or equivalent discrete or integrated logic circuitry.

Test device 20 may utilize interfaces 84 to communicate with external devices via one or more wired or wireless connections. Interfaces 84 may be network interfaces cards, universal serial bus (USB) interfaces, optical interfaces, or any other type of interfaces capable of sending and receiving information via TCP/IP. Examples of such network interfaces may include Ethernet, Wi-Fi, or Bluetooth radios.

Storage units 86 may store an operating system (not shown) that controls the operation of components of test device 20. For example, the operating system may facilitate the communication of web testing unit 88, email testing unit 90, and reporting unit 92 with processors 82 and interfaces 84. In some examples, storage units 86 are used to store program instructions for execution by processors 82, such as web testing unit 88, email testing unit 90, and reporting unit 92. Storage units 86 may also be configured to store information within test device 20 during operation. Storage units 86 may be used by software or applications (e.g., web testing unit 88, email testing unit 90, and reporting unit 92) executed by processors 82 of test device 20 to temporarily store information during program execution.

Storage units 86 may include a computer-readable storage medium or computer-readable storage device. In some examples, storage units 86 include one or more of a short-term memory or a long-term memory. Storage units 86 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

According to aspects of this disclosure, web testing unit 88, email testing unit 90, and reporting unit 92 may be configured to perform the techniques described herein. For example, web testing unit 88 may be configured to generate test data 32 described with respect to the example system of FIG. 2. Email testing unit 90 may be configured to generate test email 62 described with respect to the example system of FIG. 3. Reporting unit 92 may be configured to generate and output results data, e.g., as described with respect to security management unit 46 and event visualization tool 48 of FIG. 2 or security management unit 74 and event visualization tool 76 of FIG. 3. That is, reporting unit 92 may be configured to determine whether test data is identified at one or more visibility points as data of interest, and/or output data that indicates whether test data is identified at the one or more visibility points as data of interest.

Figure 5A:
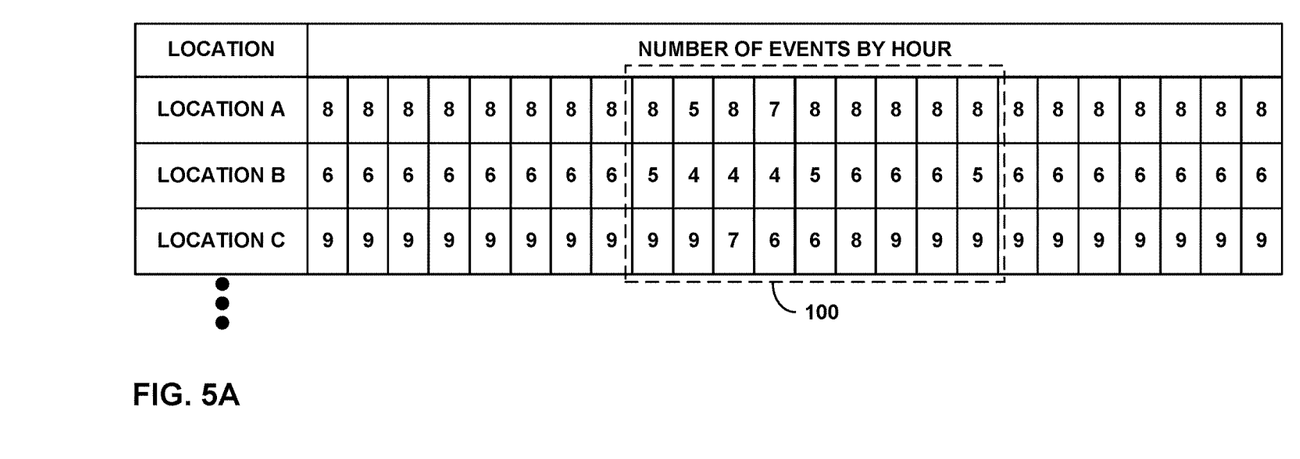
FIG. 5A is a table illustrating whether test data has been properly identified in accordance with the techniques of this disclosure.
Figure 5B:
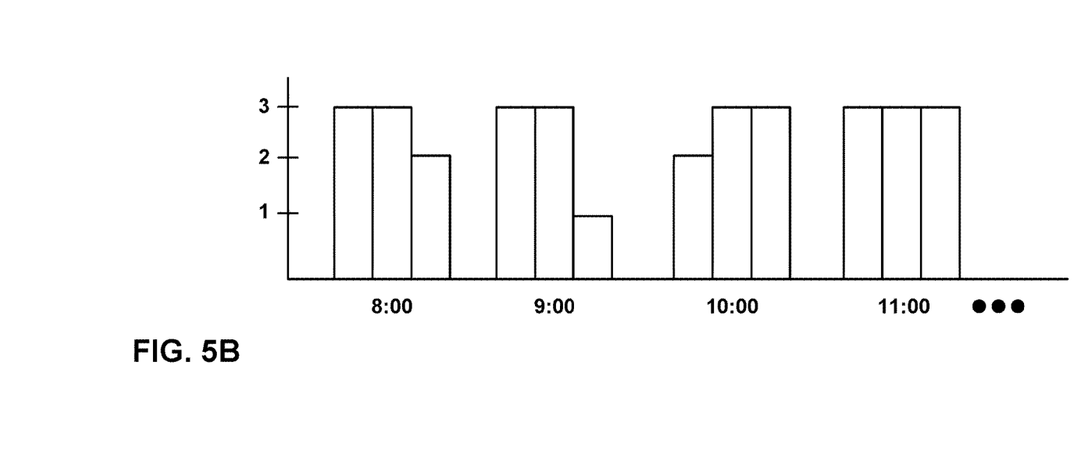
FIG. 5B is a bar chart illustrating whether test data has been properly identified in accordance with the techniques of this disclosure.

FIGS. 5A and 5B generally illustrate a visual representation of results data, e.g., data that indicates whether test data is identified at one or more visibility points as data of interest. In some examples, the representations shown in FIGS. 5A and 5B may be generated by security management unit 46 and event visualization tool 48 of FIG. 2 or security management unit 74 and event visualization tool 76 of FIG. 3.

For example, FIG. 5A is a table illustrating whether test data has been properly identified in accordance with the techniques of this disclosure. In the illustrated example, each of locations A-C has a number of web proxies that service network routes. For example, location A has 8 associated web proxies, location B has 6 associated web proxies, and location C has 9 associated web proxies.

Hence, FIG. 5A generally illustrates whether test data is identified by each network route each hour at each of locations A-C. There are a number of hours in which the test data is correctly identified by security tools of the network. However, during time period 100, each of the locations includes at least one instance in which a security tool failed to properly identify test data on at least one network route. The failures may be associated with a variety of causes. For example, a particular security tool may experience feed saturation in which more data is being routed to the security tool than the security tool is able to service. As another example, a particular security tool may experience processing saturation in which the security tool has too much processing work to be done at a specific time. In still other examples, proxies may fail such that a security tool is not being provided with test data. A system administrator may use the data shown in FIG. 5A to identify locations having performance issues to identify and correct the errors.

FIG. 5B is a bar chart illustrating whether email test data has been properly identified in accordance with the techniques of this disclosure. For example, FIG. 5B illustrates a computing system having three network routes (one route corresponds to one bar) for routing email traffic that are each tested three times per hour (three instances of test emails being injected into the network every hour). In the example of FIG. 5B, at least one security tool fails to identify test data (e.g., test emails) at each of 8:00, 9:00, and 10:00. Again, a system administrator may use the data shown in FIG. 5B to identify locations having performance issues to identify and correct the errors.

Figure 6:
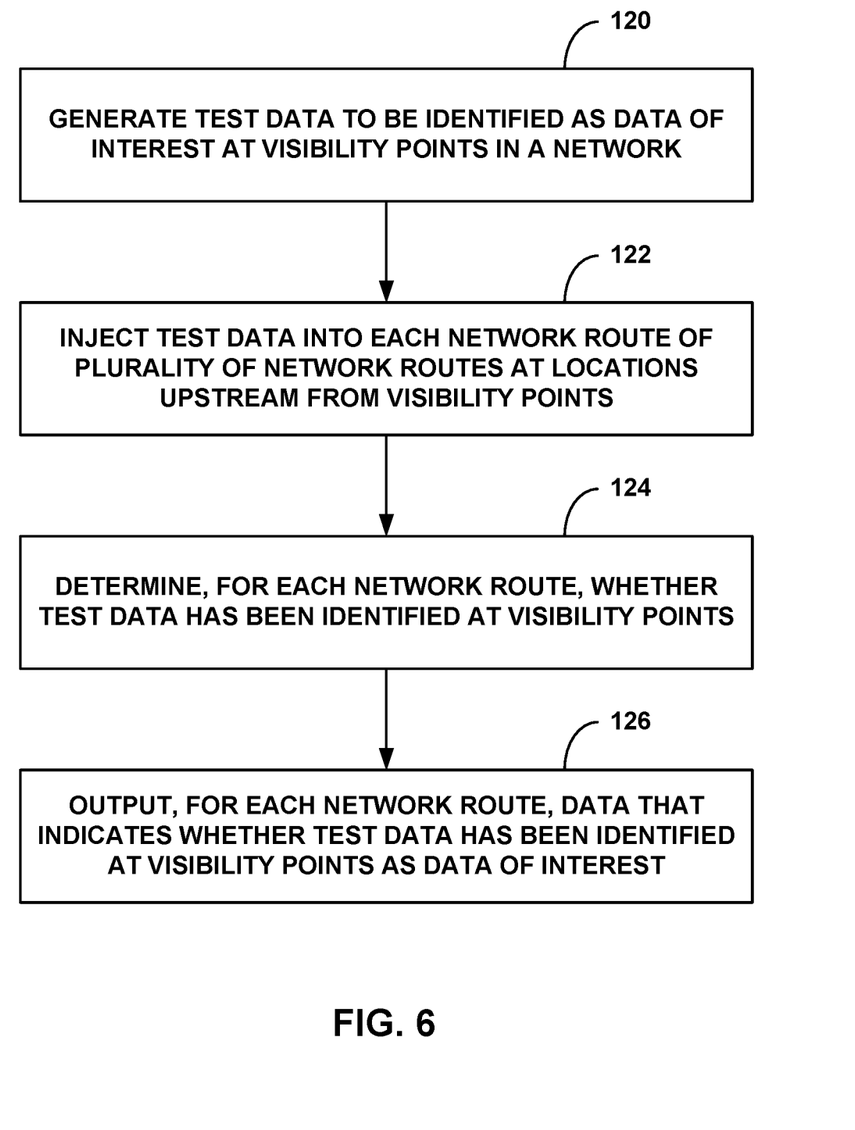
FIG. 6 is a flow chart illustrating a process for testing system effectiveness, in accordance with the techniques of this disclosure.

FIG. 6 is a flow chart illustrating a process for testing system effectiveness, in accordance with the techniques of this disclosure. The techniques described with respect to the example of FIG. 6 may be carried out by a variety of computing systems, such as those described with respect to FIGS. 1-3.

In the illustrated example, a computing device generates test data configured to be identified as data of interest at visibility points in a network (120). For example, the test data may include any data that is identifiable as data of interest by the visibility points of a computing system. The test data may be referred to as "innocuous data," in that the test data is not intended to carry out any function other than testing how effectively data is identified and/or processed by components of the system. The specific configuration of the test data may depend on the particular system effectiveness being tested. That is, the test data may be meaningful in that the test data may measure whether particular functions of the visibility points are operational. The computing device then injects the test data into each network route of a plurality of network routes at locations upstream from the visibility points in the network (122).

The computing device determines, for each network route, whether the test data has been identified at the visibility points (124). For example, the computing device (or another management or reporting tool) may obtain, from each of the visibility points, results data that indicates whether respective visibility points have identified the test data. In some examples, the computing device may also obtain other data from the visibility points, such as data indicating a time at which the test data is processed, the manner in which the visibility points identified the test data (e.g., how the visibility points categorized the test data), and/or the manner in which the visibility points process the test data (e.g., what processes the visibility points apply to the test data).

The computing device outputs, for each network route, data that indicates whether the test data has been identified at the visibility points as data of interest (126). For example, the computing device may output data indicating that one or more the visibility points did not identify the test data or improperly categorized or processed the test data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
   generating test data that is configured to be identified as data of interest at one or more visibility points in a network having a plurality of network routes, wherein generating the test data comprises generating data that indicates an initialization time of the test data;
   injecting the test data into each network route of the plurality of network routes at a location upstream from the one or more visibility points;
   determining, for each network route through which the test data travels, whether the test data is identified at the one or more visibility points;
   receiving, from the one or more visibility points, data that indicates an observation time at which the one or more visibility points identify the test data; and
   outputting, for each network route through which the test data travels, data that indicates whether the test data is identified at the one or more visibility points as data of interest and data that indicates a comparison of the initialization time of the test data to the observation time at which the test data is identified.

2. The method of claim 1, wherein the one or more visibility points comprise a plurality of visibility points, the method further comprising:
   determining, for respective visibility points of the plurality of visibility points, whether the test data is identified at the respective visibility points as data of interest.

3. The method of claim 2, wherein the respective visibility points comprise respective data security appliances configured to identify the generated test data as data of interest.

4. The method of claim 1, further comprising repeating the generating test data, the injecting the test data, the determining whether the test data is identified, and the outputting data that indicates whether the test data is identified at a predetermined time interval.

5. The method of claim 4, wherein the predetermined time interval is one of 30 minutes or one hour.

6. The method of claim 1,
   wherein determining whether the test data is identified at the one or more visibility points comprises receiving data from the one or more visibility points indicating whether the test data is identified,
   wherein one or more network routes of the plurality of network routes include a proxy having a proxy log that indicates whether the test data has been processed by the proxy, and
   wherein the method further comprises outputting data representative of a comparison of the data that indicates whether the test data is identified at the one or more visibility points to the proxy log that indicates whether the test data has been processed by the proxy.

7. The method of claim 1, wherein generating the test data comprises generating a user agent string of a network protocol to be identified as data of interest.

8. The method of claim 7, wherein generating the user agent string comprises generating the user agent string to include data that indicates a type of network route, wherein the type of network route comprises one of a single proxy route or a Virtual Internet Protocol (IP) proxy route.

9. A computer-implemented method comprising:
   generating test data that is configured to be identified as data of interest at one or more visibility points in a network having a plurality of network routes, wherein generating the test data comprises generating a type of test data;
   injecting the test data into each network route of the plurality of network routes at a location upstream from the one or more visibility points;
   determining, for each network route through which the test data travels, whether the test data is identified at the one or more visibility points;

receiving, from the one or more visibility points, data that indicates an observation data type comprising a type of data identified by the one or more visibility points; and outputting, for each network route through which the test data travels, data that indicates whether the test data is identified at the one or more visibility points as data of interest and data that indicates whether the type of test data matches the observation data type received from the one or more visibility points.

10. The method of claim 9, wherein generating the type of test data comprises generating an email having a sender that is to be identified as data of interest.

11. The method of claim 9, wherein generating the type of test data comprises generating an email that includes a symbol string that is to be identified as data of interest.

12. The method of claim 9, wherein generating the type of test data comprises generating an email that includes an attachment that is to be identified as data of interest.

13. The method of claim 9, wherein determining whether the test data is identified at the one or more visibility points comprises receiving data from the one or more visibility points indicating whether the test data is identified, wherein one or more network routes of the plurality of network routes include a proxy having a proxy log that indicates whether the test data has been processed by the proxy, and wherein the method further comprises outputting data representative of a comparison of the data that indicates whether the test data is identified at the one or more visibility points to the proxy log that indicates whether the test data has been processed by the proxy.

14. A computing system comprising:

a memory configured to store test data that is configured to be identified as data of interest at one or more visibility points in a network having a plurality of network routes; and one or more processors in communication with the memory and configured to:

generate the test data, wherein to generate the test data, the one or more processors are configured to generate data that indicates an initialization time of the test data;

inject the test data into each network route of the plurality of network routes at a location upstream from the one or more visibility points;

determine, for each network route through which the test data travels, whether the test data is identified at the one or more visibility points;

receive, from the one or more visibility points, data that indicates an observation time at which the one or more visibility points identify the test data; and output, for each network route through which the test data travels, data that indicates whether the test data is identified at the one or more visibility points as data of interest and data that indicates a comparison of the initialization time of the test data to the observation time at which the test data is identified.

15. The computing system of claim 14, wherein the one or more visibility points comprise a plurality of visibility points, and wherein the one or more processors are further configured to:

determine, for respective visibility points of the plurality of visibility points, whether the test data is identified at the respective visibility points as data of interest.

16. The computing system of claim 15, wherein the respective visibility points comprise respective data security appliances configured to identify the generated test data as data of interest.

17. The computing system of claim 14, wherein the one or more processors are configured to repeat the process of generating the test data, injecting the test data, determining whether the test data is identified, and outputting data that indicates whether the test data is identified at a predetermined time interval.

18. The computing system of claim 14, wherein, to determine whether the test data is identified at the one or more visibility points, the one or more processors are configured to receive data from the one or more visibility points indicating whether the test data is identified, wherein one or more network routes of the plurality of network routes include a proxy having a proxy log that indicates whether the test data has been processed by the proxy, and wherein the one or more processors are further configured to output data representative of a comparison of the data that indicates whether the test data is identified at the one or more visibility points to the proxy log that indicates whether the test data has been processed by the proxy.

19. A computing system comprising:

a memory configured to store test data that is configured to be identified as data of interest at one or more visibility points in a network having a plurality of network routes; and one or more processors in communication with the memory and configured to:

generate the test data, wherein to generate the test data, the one or more processors are configured to generate a type of test data;

inject the test data into each network route of the plurality of network routes at a location upstream from the one or more visibility points;

determine, for each network route through which the test data travels, whether the test data is identified at the one or more visibility points;

receive, from the one or more visibility points, data that indicates an observation data type comprising a type of data identified by the one or more visibility points; and output, for each network route through which the test data travels, data that indicates whether the test data is identified at the one or more visibility points as data of interest and data that indicates whether the type of test data matches the observation data type received from the one or more visibility points.

20. The computing system of claim 19, wherein, to determine whether the test data is identified at the one or more visibility points, the one or more processors are configured to receive data from the one or more visibility points indicating whether the test data is identified, wherein one or more network routes of the plurality of network routes include a proxy having a proxy log that indicates whether the test data has been processed by the proxy, and wherein the one or more processors are further configured to output data representative of a comparison of the data that indicates whether the test data is identified at the one or more visibility points to the proxy log that indicates whether the test data has been processed by the proxy.

* * * * *